J. M. ROSENKRANZ.
GAS MIXER.
APPLICATION FILED DEC. 4, 1916.
1,256,041.
Patented Feb. 12, 1918.
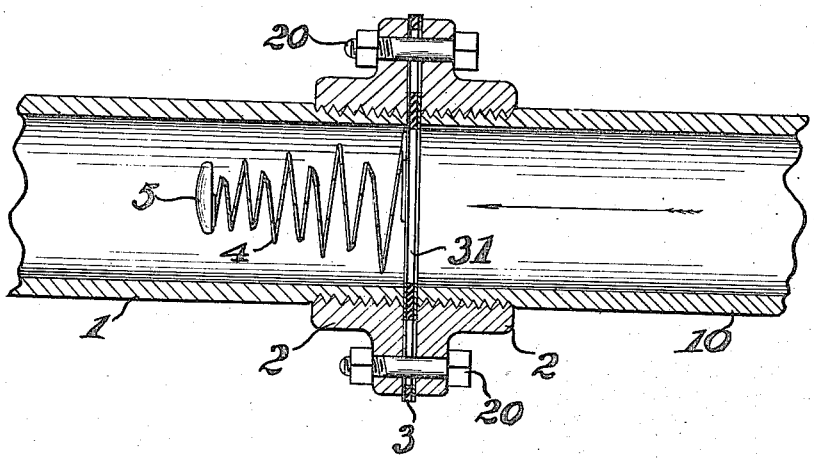
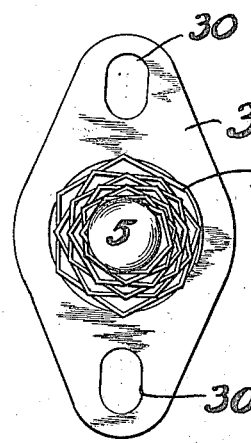
Inventor
John M. Rosenkranz
By Henry L. Reynolds.
Attorney

UNITED STATES PATENT OFFICE.

JOHN M. ROSENKRANZ, OF SEATTLE, WASHINGTON.

GAS-MIXER.

1,256,041.  Specification of Letters Patent.  Patented Feb. 12, 1918.

Application filed December 4, 1916. Serial No. 134,857.

*To all whom it may concern:*

Be it known that I, JOHN M. ROSENKRANZ, a citizen of the United States, and resident of the city of Seattle, county of King, and State of Washington, have invented certain new and useful Improvements in Gas-Mixers, of which the following is a specification.

My invention relates to devices for mixing the combustible charge for an internal combustion engine and consists of a device which is placed in the gas line, or the conduit through which the combustible mixture is supplied to the engine. It comprises the novel parts and combinations thereof which will be particularly defined in the claims.

The object of my invention is to provide a simple device which may be placed in what is known as the gas line of an internal combustion engine and which will mix and otherwise act upon the charge to secure better combustion. By the term gas line, as employed, is meant the conduits, passages and apparatus, through which the combustible mixture passes between the carbureter, or equivalent device, and the engine cylinder, through which the combustible mixture is supplied to the engine cylinder.

In the accompanying drawings I have shown my device in a simple type of construction and one which is now preferred by me.

Figure 1 is a longitudinal section through the joined ends of two pipes which are supposed to represent portions of the gas line.

Fig. 2 is a face view of the attachment which is secured between these two pipes and which constitutes my invention.

My device is herein shown as inserted in the gas line, as between the ends of two pipes, 1 and 10. These pipes are herein shown as provided with flanges 2, which are screwed thereon. These flanges are secured together by bolts 20. In applying my device in such a location as this, it is mounted upon a base consisting of a plate 3, which is preferably so constituted as to act as a packing or gasket, for the joint between the two flanges 2. This plate is shown as provided with holes 30, through which the securing bolts 20 may pass. In mounting my device in other locations, the base or support therefor may be of any construction which is adapted to the particular conditions.

Secured upon this base, when the same is employed, is a helically coiled spring 4, composed of wire and preferably with successive coils decreasing in diameter, so as to make a spring which is, in outline, the frustum of a cone. The coils of this spring are preferably composed of series of straight portions which together form a polygonal outline, these being spaced so that the points of the polygon in one turn are substantially opposite the central portion of the sides of the adjacent turns, thus producing an effect which is well illustrated in Fig. 2 and which may be called staggered. By reason of this relationship the points of one coil overlaps the central portions of the sides of the adjacent larger turn, thereby preventing collapsing of the spring to the extent of pushing one coil within another.

Upon the outer or free end of the spring 4, is placed a button or plate 5, which extends substantially perpendicular to the direction of flow of the gases. This direction is indicated by the arrow.

Placed in this position, the flow of gas, which occurs in puffs or impulses, corresponding with the suction periods of the engine cylinders, will impinge upon the plate 5 and produce a vibratory effect. This, and the passage of the mixture between the vibrating coils of the wire, acts to produce a more thorough and intimate mixture of the charge.

Where the suction is heavy the vibratory effect is quite pronounced and its action upon the bottom or plate 5 is to draw it out violently. When the suction is cut off the tension of the spring, combined with the weight of the button, causes a recoil which will bring the successive coils of the spring into contact. Being of a polygonal outline and with the corresponding sides of successive turns not parallel, the corners of the smaller turn will engage the sides of the next larger turn and prevent interlocking or sticking.

What I claim as my invention is:

1. A mixing device for the gas line of internal combustion engines comprising a spring wire helically coiled to form a polygonal conical spring, in which the like sides of successive turns of the spring are positioned to bring the corners in one coil opposite the central parts of the sides of the adjacent coils.

2. A mixing device for the gas line of internal combustion engines comprising a spring wire helically coiled to form a polygonal conical spring, in which the like sides of successive turns of the spring are given different angular positions, means for securing said spring by the end which is at the base of the cone within a suction passage, and a button secured to the small end of the cone.

Signed at Seattle, Washington, this 25th day of November, 1916.

JOHN M. ROSENKRANZ.